United States Patent [19]

Yamaya et al.

[11] 4,448,921

[45] May 15, 1984

[54] ROCK WOOL COMPOSITE MATERIAL

[75] Inventors: Eisuke Yamaya, Funabashi; Osamu Yamamoto, Chiba; Takashi Koike, Funabashi; Shunji Seino, Tokyo, all of Japan

[73] Assignees: Mitsubishi Paper Mills, Ltd., Tokyo; Nippon Aroma Co., Ltd.; Nitto Boske, both of Fukushima, all of Japan

[21] Appl. No.: 424,299

[22] Filed: Sep. 27, 1982

[30] Foreign Application Priority Data

Oct. 16, 1981 [JP] Japan ................................ 56-164311

[51] Int. Cl.³ .............................................. C08K 3/34
[52] U.S. Cl. .................................. 524/443; 524/600; 524/606; 524/608
[58] Field of Search ............... 524/443, 444, 600, 606, 524/608

[56] References Cited

U.S. PATENT DOCUMENTS 4,187,143  2/1980  Sander et al. ........................ 524/600

*Primary Examiner*—Lewis T. Jacobs
*Attorney, Agent, or Firm*—Cushman, Darby & Cushman

[57] ABSTRACT

A rock wool composite material obtained by mixing a fine rock wool having a diameter of 1 to 10μ and a length of 70 to 500μ and containing substantially no shots with a pulp-like substance of a heat-resistant aromatic polymer having a freeness value of 150 seconds or more and less than 500 seconds, is excellent in heat resistance, incombustibility, heat insulation and electrical insulation and is advantageously used as a substitute for an asbestos sheet or board.

11 Claims, No Drawings

ROCK WOOL COMPOSITE MATERIAL

This invention relates to a heat-resistant, incombustible, heat-insulating and electrically insulating composite material.

Composite materials obtained by forming asbestos fibers into a sheet, a board or a special shape have heretofore often been used in this field. However, in recent years, owing to the negative effects (e.g. carcinogenicity) of asbestos fibers on the human body, their use has drastically been limited and in some countries, there has been a trend toward the enactment of a law completely prohibiting their use. Therefore it has been desired to develop a heat-resistant, incombustible, heat-insulaing and electrically insulating composite material which can substitute for asbestos fibers.

Further, conventional composite materials obtained by using asbestos fibers are mechanically weak and brittle, and hence are liable to go to pieces or to be pulverized when formed into a sheet, a board, a rod or a special shape, so that they have very serious defects in workability.

The present inventors have devoted themselves to research on the development of a novel composite material freed from the defects of the above-mentioned asbestos fiber composite materials and as a result accomplished this invention. This invention is directed to a rock wool composite material obtained by mixing fine rock wool having a diameter of 1 to $10\mu$ and a length of 70 to 500 $\mu$ and containing substantially no shots with a pulp-like substance of a heat-resistant aromatic polymer having a freeness value of 150 seconds or more and less than 500 seconds.

The rock wool composite material of this invention is, as described above, obtained by combining rock wool with a pulp-like substance of an aromatic polymer excellent in heat resistance. The novelty of the invention resides in that the rock wool composite material has an improved strength. According to the present invention, it has made it possible to provide a heat-resistant, incombustible, heat-insulating and electrically insulating composite material which is excellent in quality compared with conventional products by the employment of very fine and short rock wool containing no unfiberized substance called "shot" which acts negatively for finely producing the composite material.

As is generally known, rock wool comprises about 40% of $SiO_2$, about 15% of $Al_2O_3$, about 38% of $CaO$, 5% of $MgO$ and 2% of impurities. The rock wool is produced by mixing basalt, diabase, olivine, silicomanganese ore, dolomite, lime, magnesium hydroxide, iron ore slag, copper slag and the like as starting material so as to obtain the above-mentioned chemical composition, melting the resulting mixture in a cupola or an electric furnace in the temperature range of from 1,500° to 1,600° C., and then dropping to melt onto a high-speed rotating body with the type of multi-spinning wheel to make the melt into fibers by centrifugal force.

The thus obtained fibers have a diameter of 1 to $10\mu$ (4 to $5\mu$ on the average) and a length of several millimeters to a maximum of about 50 millimeters and contain about 30 to 40% by weight of unfiberized substance generally called "shot" which is not made into fibers at the time of the fiber making.

Like glass wool, they are now usually applied as wall-covering, heat-insulating and sound-absorbing materials for building induries.

Examples of the use of said rock wool as a raw material for paper making are seen in fiber boards, for example, boards for ceiling, slates and the like. However, as mentioned above, the rock wool contains 30 to 40% by weight of shots, so that the product contains a large amount of unfiberized substances. Therefore the product has rough surface and shots are apt to be eliminated away. The shots disadvantageously reduce the strength of the product.

Further, there will be brought about a short life of the production facility and so many defects with respect to maintenance (for example, the wear of linings in pumps, the wear of an inner wall in a water cyclone dust-remover, stains on paper making machine (wire and felts), flaws on a dryer surface, etc.).

The present inventors have accomplished this invention by using rock rool having a length similar to that of natural pulp and containing substantially no shots.

The rock wool similar to natural pulp and containing substantially no shots can be produced by the following process.

Rock wool having a diameter of 1 to $10\mu$ (4 to $5\mu$ on the average), a length of several millimeters to 50 millimeters and a shot content of 30 to 40% by weight which are obtained in the manner described above, are finely divided to a length of 50 to $1,000\mu$ by a well-known dry or wet method and made into an aqueous dispersion having a solid content of about 5%.

Subsequently, fractionation is conducted by a well-known method to obtain only fibers having a length of $70\mu$ or more and less than $500\mu$ and containing substantially no shots which are suitable for making paper.

As to the well-known finely dividing method, high-speed cutting treatment is used. When an aqueous dispersion of rock wool which contains 10% by weight of solids is subjected to high-speed (1,000 to 2,000 revolutions/min) cutting treatment by means of a super-mixer, the fibers can be made fine to a length of $50\mu$ to $1,000\mu$ depending upon the treatment time.

The fractionation of the rock wool shortened by the dividing and the separation of shots therefrom can be carried out, for example, by the following method.

An aqueous dispersion of the finely divided rock wool which contains 5% by weight of solids is poured into a tube having a diameter of 50 mm$\phi$ and a length of 500 mm (which has such a structure that water is allowed to flow thereinto from the lower part and discharge from the upper part). Separation between shots and fibers is carried out at a flow rate of 0.5 liter/min (in this case, only the fibers are discharged from the upper part.).

Fine fibers having a desired average length and containing no shots can be obtained in the manner described above.

The rock wool used in this invention is suitably fine rock wool having a length of 70 to 500 $\mu$ and containing substantially no shots. When the fiber length is less than $70\mu$, the yield at the time of paper maing is low and the resulting sheet is practically poor in physical characteristics. On the other hand, when the fiber length exceeds $500\mu$, the fibers become very poor in dispersibility and stick together, and hence cannot be used.

The heat-resistant aromatic polymer, which is another component used in this invention, has, in recent years, been highlighted as a heat-resistant, flame-retardant and electrically insulating polymer and often been used mainly in the fields of the aircraft industry, the electric industry and the like. The representatives of said polymer are aromatic polyamides and aromatic polyamideimides, examples of which are as follows.

(1) Aromatic polyamides

Polyamides in which the main chain contains aromatic groups and consists of units represented by the general formula (1) and/or the general formula (2).

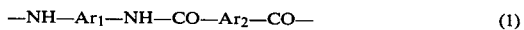

(wherein $Ar_1$, $Ar_2$ and $Ar_3$ are individually a divalent aromatic group and may be the same or different.)

Representative examples of such aromatic polyamides include poly(m-phenylene isophthalamide), poly(m-phenylene terephthalamide), poly(p-phenylene terephthalamide), poly(p-phenylene isophthalamide), poly(4,4'-oxydiphenylene isophthalamide), poly(4,4'-oxydiphenylene terephthalamide), poly(m-benzamide), poly(p-benzamide), and the like, and copolymers thereof. Aromatic polyamides containing a small amount of a component other than aromatic groups, for example, piperazine, cyclohexanedicarboxylic acid or the like may also be used.

(2) Aromatic polyamideimides

Polyamideimides having units represented by the following general formula:

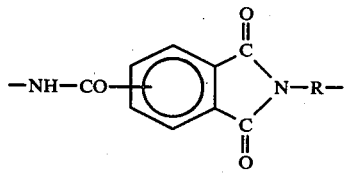

wherein R is 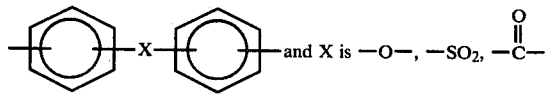

or a lower alkylene group.

The pulp-like substance used in this invention is particles of a fibrous, filmy or ribbon-like structure having many projections. The particles can be obtained by introducing a solution of said aromatic polyamide or aromatic polyamideimide into a precipitant to coagulate the polymer as fine particles. For example, the production process disclosed in Japanese Patent Publication 5732/62 may be used.

As the pulp-like substance of said polymer in this invention, there may be used those having a freeness value of 150 seconds or more or less than 500 seconds as measured by the test method hereinafter described. More preferable are pulp-like substances in which said freeness value is 160 seconds or more and less than 400 seconds.

Coarse pulp-like substances having a freeness value of less tham 150 seconds have too long fiber length, so that mixed slurries of the substances and rock wool have a greatly lowered dispersability and the formation is insufficient at the time of forming a paper layer (at the time of paper making), and therefore they give only a sheet poor in physical strength.

On the other hand, fine pulp-like substances in which said freeness value exceeds 500 seconds are good in dispersability but difficult to be dehydrated at the time of forming a paper layer. Hence they are not preferable from the viewpoint of the efficiency of paper making.

The freeness value used in the specification is a measure for evaluation of the water-filtering property of pulp obtained by the following test method. Water is added to a pulp-like substance to prepare a 0.3% aqueous dispersion (20° C.). One liter of the slurry is transferred to a cylindrical vessel having an inside diameter of 102 mm$\phi$ (a net of 78 mesh is set at the bottom). The time length (seconds) required to obtain 500 ml of a filtrate in this case, is referred to as "freeness value".

The product of this invention is obtained, as described above, by mixing fine rock wool having a diameter of 1 to 10$\mu$ and a length of 70 to 500$\mu$ and containing substantially no shots with a pulp-like substance of a heat-resistant aromatic polymer having a freeness value of 150 seconds or more and less than 500 seconds, and forming the resulting mixture into a sheet, a board or a special shape by a wet method. The mixing ratio of the fine rock wool and the pulp-like substance of the heat-resistant aromatic polymer is, in usual, properly selected in a range of from 10:90 to 90:10 by weight.

When the rock wook composite material of this invention is formed into a sheet, an aqueous dispersion of the aforesaid mixture and a paper machine such as a Fourdrinier paper machine, a paper machine of inclined wire type, and a cylinder paper machine are used. A molded article of a special shape is obtained, for example, by a well-known wet molding method. It is sufficient that the water content of wet paper is adjusted to 20 to 95% by dehydration and compression. When the water content is less than 20%, the pulp-like substance and the fine rock wool are hindered from being intertwined, and when it is 95% or more, the workability of the wet paper is lowered.

In general, the sheet formation can properly be carried out in the range of the water content of from 30 to 90%, and in this case, ordinary various conditioners and additives may be used in such a range that the object of this invention is not defeated. The additives may be added directly to a starting slurry, or impregnated, coated or sprayed after the slurry is formed into wet paper or further dried. As the conditioners and the additives, there may be exemplified polyacrylamide, polyethylene oxide, acidic colloidal dispersion of melamine resins, polyamideamine-epichlorohydrin, phenolic resins, epoxy resins, fluorine containing resins, silicone resins, synthetic rubber resins, various emulsions of above-mentioned resins, various coupling agents for subjecting the surface of rock wool to chemical treatment, etc.

The thus obtained sheet by a usual paper making method can have a desired thickness. If necessary, it is possible to obtain the sheet having a desired density by pressing treatment or hot-pressing treatment by means of a heating roll or the like. The heating temperature in this case is determined in consideration of the softening point and melting point of the aforesaid polymer. It makes it possible to finish the sheet to those ranging from a porous sheet to a film-like sheet.

In forming the product of this invention into a sheet, the above-mentioned system composed of a pulp-like substance consisting of a heat-resistant aromatic polymer and fine rock wool may contain not only a pulp-like substance of another polymer such as an aromatic polyester, an aliphatic polyester, a polyolefin and a polycarbonate but also a fibrous substance consisting of each of the same materials as described above. Particularly in this invention, a product having various uses as various composite materials can be obtained by replacing a fiber of aromatic polymer by a pulp-like substance of the same material in an arbitrary range. Needless to say, inorganic fibers such as glass fiber or organic fibers may be added.

Such composite materials may be used alone or as laminates thereof. They can be made into various materials by making them into paper together with a reinforcing material layer or by laminating them with said layer. In order to facilitate handling, sheet materials obtained by this invention may be lined with strand, yarn or net of various fibers, or a heat-resistant sheet material such as aromatic polyamide paper. These additionally used material may be sandwiched therein as a middle layer and/or as a backing layer. These procedures can easily be carried out on said paper machine or by means of a separate processing machine by a well-known method, and are useful for improving the universal usability of the rock wool composite materials of this invention.

The rock wool composite materials obtained by this invention are very effectively used in place of various asbestos sheet materials, board materials, molding materials and the like for heat resistance, incombustibility, heat insulation, sound deadening, electrical insulation and the like.

Further, they are also effectively used for uses other than those of asbestos products, for example, flexible print circuit, covering materials for flexible exhaust pipe of automobile engine, brake shoes, gaskets, electrically insulating paper for layer insulation and electrically insulating paper for coil bonding, heat-resistant electric wire, etc.

Examples of this invention are given below. Parts in Examples are by weight.

PREPARATION EXAMPLE 1

In 90 parts of N,N-dimethylacetamide containing 5 parts of LiCl was dissolved 10 parts of polymethaphenylene isophthalamide having a logarithmic viscosity value of 1.5 as measured in sulfuric acid, and the resulting solution was introduced into an aqueous glycerol solution in a homo-mixer stirring the contents at a high speed to obtain a pulp-like substance. The freeness value of the pulp-like substance was 200 seconds. On the other hand, fibers of 2 deniers obtained by wet-spinning polymetaphenylene isophthalamide into yarn and subjecting the yarn to 2.5-fold drawing treatment in boiling water were cut to a length of 6 mm to obtain short fibers.

PREPARATION EXAMPLE 2

In 90 parts of N-methyl-2-pyrrolidone was dissolved 10 parts of polyamideimide (logarithmic viscosity value in N-methyl-2-pyrrolidone: 0.5) obtained by reacting trimellitic acid anhydride with 4,4'-diaminodiphenylmethane in a molar ratio of 2:1, and then adding thereto trimellitic acid anhydride and 4,4'-diphenylmethane diisocyanate in a molar ratio of 2:3. The resulting solution was introduced into an aqueous glycerol solution in a homo-mixer stirring the contents at a high speed to obtain a pulp-like substance. The freeness value of the pulp-like substance was 250 seconds.

PREPARATION EXAMPLE 3

(Comparison)

In 85 parts of N,N-dimethylacetamide containing 5 parts of LiCl was dissolved 15 parts of polymethaphenylene isophthalamide having a logarithmic viscosity value of 1.5 as measured in sulfuric acid, and the resulting solution was introduced into an aqueous glycerol solution in a homo-mixer stirring the contents at a high speed to obtain a pulp-like substance. The freeness value of the pulp-like substance was 100 seconds.

On the other hand, fibers of 2 deniers obtained by wet-spinning polymethaphenylene isophthalamide into yarn and subjecting the yarn to 2.5-fold drawing treatment in boiling water were cut to a length of 6 mm to obtain short fibers.

PREPARATION EXAMPLE 4

(Comparison)

In 94 parts of N,N-dimethylacetamide containing 5 parts of LiCl was dissolved 6 parts of polymethaphenylene isophthalamide having a logarithmic viscosity value of 1.5 as measured in sulfuric acid, and the resulting solution was introduced into an aqueous glycerol solution in a homo-mixer stirring the contents at a high speed to obtain a pulp-like substance. The freeness value of the pulp-like substance was 500 seconds.

On the other hand, fibers of 2 deniers obtained by wet-spinning polymethaphenylene isophthalamide into yarn and subjecting the yarn to 2.5-fold drawing treatment in boiling water were cut to a length of 6 mm to obtain short fibers.

EXAMPLE 1

With 30 parts of the pulp-like substance of polymethaphenylene isophthalamide having a freeness value of 200 seconds obtained in Preparation Example 1 were mixed 20 parts of polymethaphenylene isophthalamide fiber and 50 parts of fine rock wool having an average length of $150\mu$ and an average diameter of $4.1\mu$ and containing no shots, and an aqueous dispersion of the resulting mixture having a solid concentration of 1% was prepared.

The dispersion was made into wet paper by means of a Fourdrinier paper machine, transferred to a felt, and compressed to adjust its water content to 60%. The thus obtained wet paper was dried by means of a dryer to obtain the sheet of the present invention. The characteristic values of the product are shown in Table 1-A.

EXAMPLE 2

With 30 parts of the pulp-like substance of aromatic polyamideimide obtained in Preparation Example 2 was mixed 70 parts of fine rock wool having an average length of $250\mu$ and an average diameter of $4.1\mu$ and containing no shots, and an aqueous dispersion of the resulting mixture having a solid concentration of 1% was prepared.

The dispersion was made into wet paper by means of a cylinder paper machine, transferred to a felt, and dehydrated to adjust its water content to 80%. Fifty sheets of the thus obtained wet paper were laminated using a making drum and then compressed and dried by means of a hot press at 40 kg/cm$^2$ and 140° C. to obtain a molded article of a board shape. The characteristics of the product are shown in Table 1-B.

COMPARATIVE EXAMPLE 1

A comparative sheet was obtained in the same manner as in Example 1, except that the polymethaphenylene isophthalamide having a freeness value of 200 seconds used in Example 1 was replaced by that having a freeness value of 100 seconds obtained in Preparation Example 3. The characteristic values of the sheet are shown in Table 1-C.

COMPARATIVE EXAMPLE 2

The pulp-like substance having a freeness value of 500 seconds obtained in Preparation Example 4 was bad in workability both in purification and in paper making by use of said substance, and could not industrially be used.

wherein $Ar_1$, $Ar_2$, and $Ar_3$ are each a divalent aromatic group or an aromatic polyamide having units represented by formula (3):

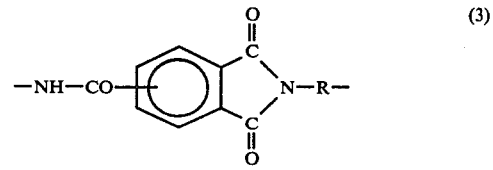

where R is  or

TABLE 1

|  |  | A<br>Example 1 | B<br>Example 2 | C<br>Comparative<br>Example 1 | Remark<br>Measurement<br>method |
| --- | --- | --- | --- | --- | --- |
| Basis weight | g/m² | 85.5 | 1570 | 84.8 | JISC-2111 |
| Thickness | mm | 0.19 | 1.7 | 0.23 | " |
| Density | g/cm³ | 0.45 | 0.92 | 0.37 | " |
| Tensile strength (kg/20 mm) | Machine direction | 3.1 | 75.4 | 2.2 | " |
|  | Cross direction | 2.5 | 45.1 | 1.7 | " |
| Elongation (%) | Machine direction | 2.1 | 9.1 | 1.8 | " |
|  | Cross direction | 2.5 | 9.8 | 2.2 | " |
| Burning test | Carbonized length (mm) | 5.4 | 0 | 5.6 | JISL-1091 |
|  | Embering flammability after burning (seconds) | 0 | 0 | 1.8 | " |
|  | Residual flame (seconds) | 0 | 0 | 0 | " |
| Dielectric strength (kV/mm) |  | 8.9 | 19.8 | 7.1 | JISC-2111 |
| Thermal conductivity Cal/cm · sec °C. |  | 0.18 × 10⁻³ | 0.19 × 10⁻³ | 0.18 × 10⁻³ | JISA-1413 |

What is claimed is:

1. A rock wool composite material comprising a fine rock wool having a diameter of 1 to 10μ and a length of 70 to 500μ and containing substantially no shots and a heat-resistant aromatic polymer which is an aromatic polyamide or aromatic polyamideimide having a freeness value of 150 seconds or more or less than 500 seconds when measured as an 0.3% aqueous dispersion (20° C.), the weight ratio of fine rock wool to the heat-resistant aromatic polymer being 10:90 to 90:10.

2. A rock wool composite material according to claim 1, wherein the heat-resistant aromatic polymer is an aromatic polyamide.

3. A rock wool composite material according to claim 1, wherein the heat-resistant aromatic polymer is an aromatic polyamideimide.

4. A rock wool composite material according to claim 1, wherein the freeness value of the heat-resistant aromatic polymer is 160 to 450 seconds.

5. A process for producing a rock wool composite material sheet by making the rock wool composite material of claim 1 into a wet sheet having a water content of 20 to 95%.

6. A process according to claim 5, wherein the water content is 30 to 90%.

7. A rock wool composite material according to claim 1 wherein the aromatic polymer is an aromatic polyamide of formula (1) or formula (2):

$$-NH-Ar_1-NH-CO-Ar_2-CO- \quad (1)$$

$$-NH-Ar_3-CO- \quad (2)$$

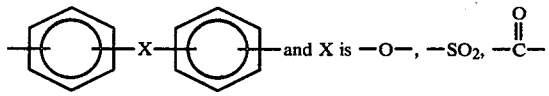

or a lower alkylene group.

8. A rock wool composite material according to claim 7 wherein the aromatic polymer is a polyamide which is poly(m-phenylene isophthalamide), poly(m-phenylene terephthalamide), poly(p-phenylene terephthalamide), poly(p-phenylene isophthalamide), poly(4,4'-oxydiphenylene isophthalamide), poly(4,4'-oxydiphenylene terephthalamide), poly(m-benzamide) or poly(p-benzamide), or copolymers thereof.

9. A rock wool composite material according to claim 7 wherein the aromatic polymer is a polyamide of formula (3):

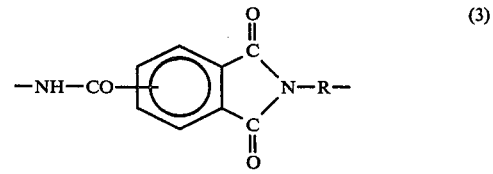

wherein R is  or

-continued

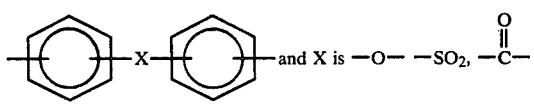

or a lower alkylene group.

10. A rock wool composite material according to claim 7 wherein the aromatic polymer is polymetaphenylene isophthalamide.

11. A rock wool composite material according to claim 7 wherein the aromatic polymer is polyamideimide prepared by reacting trimellitic anhydride and 4,4′-diaminodiphenylmethane in a molar ratio of 2:1 and then adding thereto trimellitic anhydride and 4,4′-diphenylmethane diisocyanate in a molar ratio of 2:3.

* * * * *